US012368606B1

(12) United States Patent
Liu et al.

(10) Patent No.: US 12,368,606 B1
(45) Date of Patent: Jul. 22, 2025

(54) SECURE VERIFICATION OF PHYSICAL UNCLONABLE FUNCTION

(71) Applicant: Marvell Asia Pte Ltd, Singapore (SG)

(72) Inventors: Chen Liu, Sunnyvale, CA (US); Jun Yu, Northborough, MA (US); Kaichuan Chang, Fremont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 30 days.

(21) Appl. No.: 18/472,521

(22) Filed: Sep. 22, 2023

Related U.S. Application Data

(60) Provisional application No. 63/409,125, filed on Sep. 22, 2022.

(51) Int. Cl.
*H04L 9/32* (2006.01)
(52) U.S. Cl.
CPC .......... *H04L 9/3278* (2013.01); *H04L 9/3242* (2013.01)
(58) Field of Classification Search
CPC ............................. H04L 9/3278; H04L 9/3242
USPC ........................................................ 713/189
See application file for complete search history.

(56) References Cited

U.S. PATENT DOCUMENTS

| 2008/0279373 | A1* | 11/2008 | Erhart | H04L 9/3249 714/E11.017 |
| 2017/0126414 | A1* | 5/2017 | Goel | G06F 3/0679 |
| 2018/0248690 | A1* | 8/2018 | Fukuda | H04L 9/08 |
| 2021/0392004 | A1* | 12/2021 | Kim | H04L 9/3268 |

* cited by examiner

*Primary Examiner* — Dereena T Cattungal

(57) ABSTRACT

The present disclosure describes apparatuses and methods for implementing secure verification of a physical unclonable function (PUF). In various aspects, a PUF verifier generates a PUF reagent value by obtaining a key from a PUF and a message value useful for PUF verification. The PUF verifier computes a digest value of the PUF key and the message value and selects a portion of the hash digest as a PUF reagent value. The PUF verifier writes the PUF reagent value to a non-volatile memory to enable subsequent verification of the PUF. The PUF verifier may also generate error-correction code information for the PUF reagent value and write this information to the non-volatile memory to enable error correction. Upon device hardware reset, the PUF verifier can securely verify PUF operation by generating a PUF key hash digest and comparing the hash digest with the PUF reagent value without exposing the PUF key.

20 Claims, 13 Drawing Sheets

SECURE VERIFICATION OF PHYSICAL UNCLONABLE FUNCTION

CROSS REFERENCE TO RELATED APPLICATION

This present disclosure claims priority to U.S. Provisional Patent Application Ser. No. 63/409,125 filed Sep. 22, 2022, the disclosure of which is incorporated by reference herein in its entirety.

BACKGROUND

Computing and electronic devices often implement security measures to prevent unauthorized entities from accessing data or communications of the device. Some of these security measures encrypt data or communications using a particular key that is unique to the device. Typically, the encrypted data or communicated message is decrypted by the device with the same key or by an intended recipient that possesses a copy of the key or a complimentary key. Alternately, the device can decrypt, with the key, the encrypted message received from a source that encrypted the data with a complementary key for secure communication.

The key of the device, however, is typically programmed to device memory in a manufacturing environment that is not secure or stored in a memory of the device for use after the device is released to a user. In some cases, malicious entities exploit security vulnerabilities of device programming equipment, the device itself during the key assignment process, or the memory in which the key is stored to access the device's key. In such cases, the malicious entity can then compromise device security measures by stealing the key on that device, including secure boot operations of the device or the encryption of the device's data and communications that rely on the secrecy of the key. As such, exposing the secret key during manufacture or maintaining the secret key on the device may compromise security of the device and other devices or networks that use the same or similar secret keys.

SUMMARY

This summary is provided to introduce subject matter that is further described in the Detailed Description and Drawings. Accordingly, this Summary should not be considered to describe essential features or used to limit the scope of the claimed subject matter.

In some aspects, a method for secure verification of a physical unclonable function (PUF) is described that includes obtaining a key from a PUF of an integrated circuit as a PUF key and obtaining a message value used in PUF verification. The method computes a digest value of the PUF key and the message value and selects at least a portion of the hash digest as a PUF reagent value. The PUF reagent value is then written to a non-volatile memory or one-time programmable (OTP) memory of the integrated circuit to enable subsequent verification of the PUF. By doing so, the PUF of the integrated circuit can be securely verified by comparing a digest of a subsequently generated PUF key to the PUF reagent value without exposing the PUF key or any value from which the PUF key can be derived. The secure verification may ensure both the correctness of the PUF operation and accuracy of the PUF key values provided by the PUF for various cryptographic functions.

In some aspects, a method for secure verification of a PUF is described that includes obtaining a key from a PUF of an integrated circuit as a PUF key and obtaining a message value used in PUF verification. The method then computes a digest value of the PUF key and the message value and obtains a PUF reagent value from a non-volatile memory of the integrated circuit. The method includes comparing at least a portion of the hash digest of the PUF key with a corresponding portion of the PUF reagent value to verify the PUF key. Based on the comparison, the method can indicate verification of the PUF in response to the at least a portion of the hash digest of the PUF key matching the corresponding portion of the PUF reagent value. Alternatively, the method can indicate failure to verify the PUF in response to the portion of the hash digest of the PUF key not matching the corresponding portion of the PUF reagent value.

In other aspects, an integrated circuit includes a PUF configured to generate key values, a cryptographic function configured to compute hash digests, a non-volatile memory, a processor configured to execute secure firmware, and a PUF verifier. The PUF verifier is configured to load a PUF key from the PUF to the cryptographic function and load a message value useful for PUF verification from the processor to the cryptographic function. The PUF verifier then directs the cryptographic hash function to compute a digest value of the PUF key and the message value and selects at least a portion of the hash digest as a PUF reagent value. The PUF verifier then writes the PUF reagent value to the non-volatile memory (e.g., OTP memory) of the integrated circuit to enable subsequent verification of the PUF.

The details of one or more implementations are set forth in the accompanying drawings and the following description. Other features and advantages will be apparent from the description and drawings and from the claims.

BRIEF DESCRIPTION OF THE DRAWINGS

The details of one or more implementations of secure verification of a PUF are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
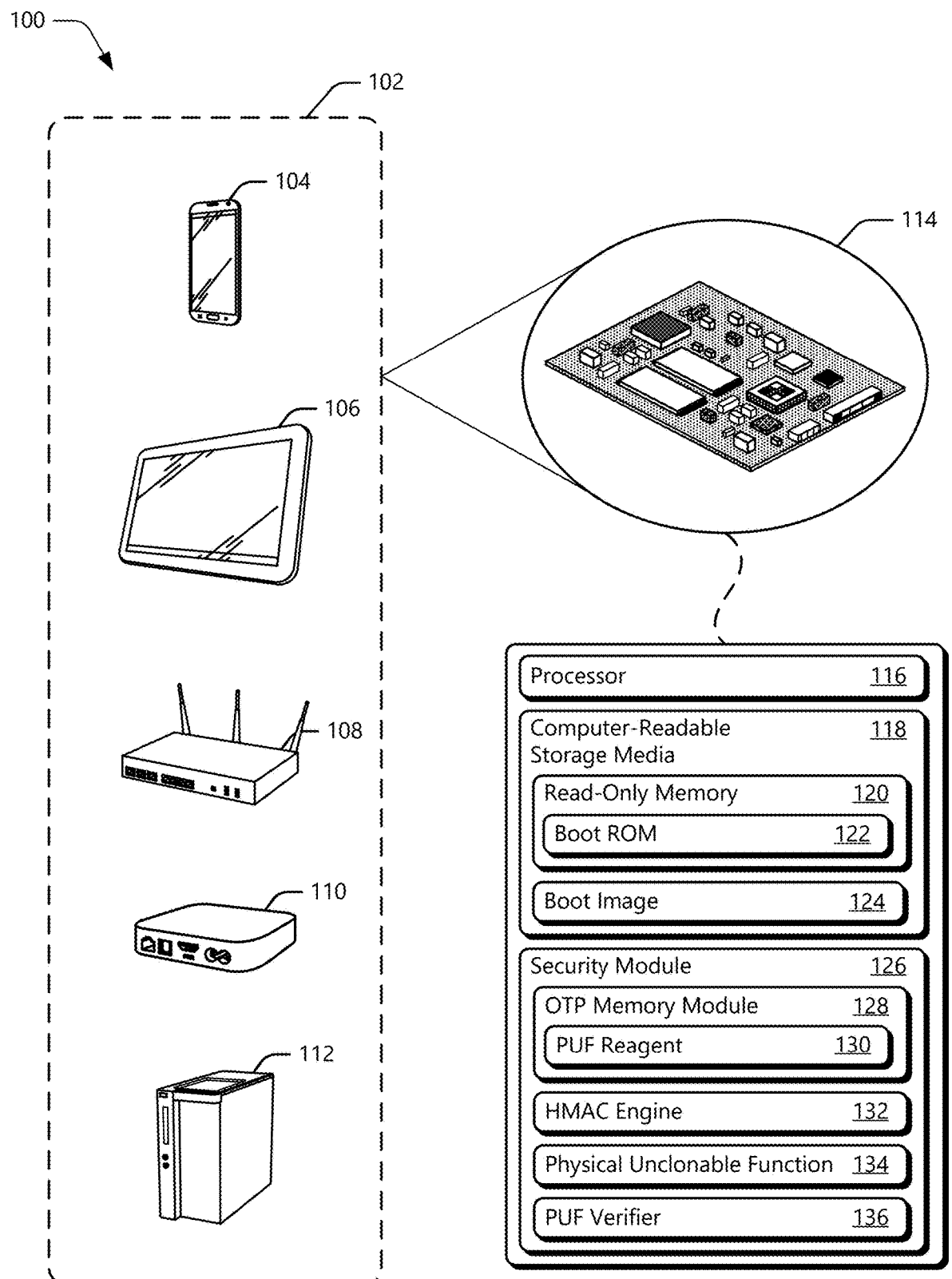
FIG. 1 illustrates an example operating environment having systems in which secure verification of a PUF can be implemented in accordance with one or more aspects of the disclosure.

Preceding techniques for provisioning or storing root or secret keys of electronic devices often expose the root keys during the provisioning process, maintain the keys on the device, or expose some part of the keys during use by the device. For example, some secret key provisioning processes use a single program to generate, manipulate, buffer, and write a root key into a memory of a device. Such applications are typically complex, non-secure, and downloaded to the device prior to execution, all of which contribute to vulnerabilities that can be exploited by malicious actors to access the secret key of the device. Additionally, some secret keys are generated with low entropy or stored in the memory of the device after provisioning, which allows the secret key of the device to be more-easily derived or corrupted by malicious actors. Thus, the preceding techniques for generating secret keys, storing the secret keys on the device, and using secret keys that may be corrupted can result in devices and communications or data of the device vulnerable.

This disclosure describes techniques and apparatuses for secure physical unclonable function (PUF) verification, which may enable verification of a PUF key generated by a security module of the device without exposing the key or a portion of the key from which the key can be derived. In various aspects, an integrated circuit or system-on-chip may include a security module with a physical unclonable function (PUF) configured to generate a key value (e.g., a secret key) for a device and cryptographic functions that use or rely on the key value to enable secure functions of the device. For example, instead of storing the key in a memory of the device, the PUF can generate the key for the device when the device is booted or reset, and the key and other cryptographic information of the device is not maintained after the security module loses power. As such, malicious actors cannot access the key during manufacture of the device or from a memory of the device because the key generated by the PUF is not exposed or saved to memory. In other words, the PUF can reconstruct a cryptographic key on-the-fly, reliably over time, instead of storing the key in memory of the device.

The key derived from the PUF, however, may be susceptible to aberration or discrepancy over time due to microelectronics aging other types of hardware faults, such as abnormal clock jitter, out-of-range voltage, extreme temperature, and so forth. While the PUF design for secret key accessibility restraint improves security by preventing exposure of the PUF key, this also prevents direct key value verification. Generally, a discrepancy in secret key value would result in cryptographic service failure whenever the PUF key is involved. Various factors may lead to these discrepancies, which may include microelectronic aging, structural damage from cosmic rays, power voltage glitches, clock jitter, temperature out of range, or the like. In some cases, microelectronic aging or structural damage may result in permanent key value discrepancy where the PUF is no longer able to consistently generate key values. Moreover, upon failure of the PUF, the key access restraint associated with the PUF makes diagnosing the root cause of the failure difficult.

In aspects of secure verification of a PUF, a PUF verifier or a security module with PUF verification circuitry can use a PUF aging reagent (PUF reagent) as a secure fingerprint to verify an underlying PUF key generated by the PUF. In addition to the ability to verify the PUF key, the PUF reagent, which is derived by a cryptographic hash algorithm, is also inherently secure in the context of cryptanalysis. In other words, knowledge of the PUF reagent will not assist a malicious actor in determining the underlying PUF key through reverse analysis of the reagent value. In aspects, any suitable type of message authentication code (MAC) may be used to generate the PUF reagent, such as a secure hash algorithm 2 (SHA-2) or SHA-2 based hash-based MAC or a block cipher (e.g., advanced encryption standard (AES)). Generally, any construction that defines a mathematical mapping relationship between the PUF key and its fingerprint or hash can be used to derive the PUF reagent value.

Because the PUF reagent cannot be used to derive keys provided by the PUF, the PUF reagent value may be stored on the device or in the security module. In aspects, the PUF verifier or verification circuit stores the PUF reagent value to one-time programmable (OTP) fuse-based memory after a PUF key is initially generated by the PUF. Additionally, the PUF verifier may generate error-correction code (ECC) information (e.g., parity information) for the PUF reagent value and store the ECC information with the PUF reagent value to the OTP memory, which may ensure data integrity of the PUF reagent value. As OTP memory is difficult to manipulate after being written, storing the PUF reagent value in OTP further reinforces security of the PUF reagent value and keys against potential attacks.

In aspects, a secure verification process for the PUF may be implemented as part of device start up, making it difficult to bypass or intervene in the secure verification process. In other words, the secure verification process of the PUF is a compulsory phase built into a power-on execution sequence of device hardware, which is enforced immediately after a system power-on-reset event. This design may serve as a reinforcement against potential security attacks on the secure verification procedure and the device hardware can be prevented from booting in response to failure of the secure verification process. As described herein, the secure verification process is also reliable in the perspective of hypothesis testing, with extremely low probabilities for type I (false positive) and type II (false negative) errors.

Additionally, the secure verification process for the PUF may be linked with a life cycle state of a device to further protect the use of PUF keys and the PUF reagent value for verification operations. For example, the generation and writing of the PUF reagent value to the OTP memory fuses may be restricted to a "provision" or "manufacture" life cycle state of a device or system-on-chip that includes the PUF or a PUF-enabled security module. Generally, a device or chip is maintained within a manufacturing facility during the "provision" life cycle state, when the device or chip is subject to programming, processing, or provisioning of protected information.

When provisioning of the device is complete, including the writing of the PUF reagent value, the life cycle state of the device is advanced from "provision" to a "deployed", "field", "user", "non-manufacturing", "non-debug", or non-development" life cycle state that restricts access to the chip or security module before it can be shipped to a customer or end user. As such, the derivation and burning of the PUF reagent value to OTP memory is ensured to be completed prior to release of the device to market. Further, many devices store a record of life cycle state the fuse-based OTP memory, and management of the life cycle state advances as a one-way operation. Thus, the life cycle state of the device can only be advanced from "provision" to "deployment" to further restrict an attacker's access to the security module and PUF reagent information. These are only a few advantages provided by aspects of secure verification of a PUF, others of which are described throughout the disclosure.

In various aspects of secure verification of a PUF, a PUF verifier generates a PUF reagent value by obtaining a key from a PUF and a message value useful for PUF verification. The PUF verifier then computes a digest value of the PUF key and the message value and selects a portion of the hash digest as a PUF reagent value. The PUF verifier writes the PUF reagent value to a non-volatile memory (e.g., OTP memory) to enable subsequent verification of the PUF. In some aspects, the PUF verifier also generates error-correction code information for the PUF reagent value and writes this information to the non-volatile memory to enable error correction. On hardware resets, the PUF verifier can securely verify PUF operation by generating a PUF key, computing a hash digest from the PUF key, and comparing the hash digest with the PUF reagent value without exposing the PUF key.

The following discussion describes an operating environment, techniques that may be employed in the operating environment, and a System-on-Chip (SoC) in which components of the operating environment may be embodied. In the context of the present disclosure, reference is made to the operating environment or various components by way of example only.

Operating Environment

FIG. 1 illustrates an example operating environment 100 that includes an example computing device 102, which is capable of implementing cryptography and other security functions. Examples of the computing device 102 include a smart phone 104, a tablet computer 106, a wireless router 108, a set-top box 110, and a network-attached storage (NAS) device 112. Further examples of the computing device 102 include a desktop computer, a camera, a printer, a set-top-box, a data storage appliance, a wearable smart-device, a television, a content-streaming device, a high-definition multimedia interface (HDMI) media stick, a smart appliance, a home automation controller, smart thermostat, Internet-of-Things (IoT) device, mobile-internet device (MID), a network-attached-storage (NAS) drive, aggregate storage system, gaming console, automotive entertainment device, automotive computing system, automotive control module (e.g., engine or power train control module), and so on. The computing device 102 may implement cryptography or security functions for any suitable purpose, such as to enable security functionalities of a particular type of computing device, enable secure network access, encrypt data for storage, verify software signatures, authenticate users or other devices, sign electronic files or documents, and the like.

The computing device 102 includes a printed circuit board assembly 114 (PCBA) 114 on which components and interconnects of the computing device are embodied. Alternately or additionally, components of the computing device 102 can be embodied on additional circuit boards or other substrates, such as flexible circuit material or other insulative material. Although not shown, the computing device 102 may also include a housing, various human-input devices, a display, a battery pack, antennas, and the like. Generally, electrical components and electromechanical components of the computing device 102 are assembled onto a printed circuit board (PCB) to form the PCBA 114. Various components of the PCBA 114 (e.g., processors and memories) are then programmed, provisioned, and tested to verify correct function of the PCBA. The PCBA 114 can then be connected to or assembled with other parts of the computing device 102 into a housing.

In this example, the PCBA 114 includes a processor 116 and computer-readable storage media 118. The processor 116 can be any suitable type of processor, either single core or multi-core, for executing instructions or commands of an operating system or application of the computing device 102. The computer-readable storage media 118 (CRM 118) includes volatile memory and non-volatile memory for storing various data and instructions of the computing device 102. In the context of this disclosure, the CRM 118 is implemented as storage media, and thus does not include transitory signals or carrier waves.

The CRM 118 includes a read-only memory 120 (ROM 120) storing boot ROM code 122 (Boot ROM 122), which can be executed at power-on to initialize components of the computing device 102. Alternately or additionally, the boot ROM 122 may program or configure components of the PCBA 114 during various stages of test and assembly. The CRM 118 also includes a boot image 124 to boot the computing device 102 and perform other functions, such as system initialization, component configuration, security-related operations, and the like. The implementations and uses of boot ROM 122 and boot image 124, which may include firmware or an operating system of the computing device 102.

A security module 126 of the PCBA 114 may enable various secure functions of the computing device 102, which may include secure booting, data encryption, communication encryption, encrypt data for storage, verify software signatures, authenticate users or other devices, sign electronic files, and so forth. In some cases, the security module 126 is implemented as an embedded hardware security module (eHSM) of the computing device and provides various security features to ensure data integrity of the device. In aspects, the security module 126 includes a one-time programmable (OTP) memory module 128, which may be used to store a PUF reagent value 130 (PUF reagent 130). The OTP memory module 128 may include an OTP memory control logic and OTP memory media (not shown), such as fuse or anti-fuse banks that are irreversibly burned to program.

The security module 126 also includes a hash-based message authentication (HMAC) engine 132, a physical unclonable function 134 (PUF 134), and a PUF verifier 136. Although not shown, the security module 126 may include additional or alternate types of cryptographic processors or hashing modules for implementing s security functions of the computing device 102. The HMAC engine 132 can be configured to provide hashes or digests of digital data and may implement any set of cryptographic hash functions or comply with a particular standard, such as SHA256-2, SHA256-3, AES, or the like. Generally, the HMAC engine 132 may operate as a one-way function useful to mask or prevent a PUF key from being reverse calculated from a digest-based PUF reagent value 130. Generally, the physical unclonable function 134 (PUF 134) is configured to provide a full entropy cryptographic key which is unique to an individual PUF and unclonable.

In some implementations, the PUF 134 is directly coupled to the HMAC engine 132, provides PUF key values directly to the HMAC engine 132, and does not include a register in this key path such that the PUF keys are not accessible by firmware, users, or any other entity of the security module 126 to protect device sensitive and secret information. In other words, the PUF keys cannot be directly verified, which creates potential issues when PUF values vary due to ageing, defects, random hardware faults, or extreme environmental conditions while the computing device 102 is deployed or in the field. Thus, for security purposes, the PUF keys are not exposed or accessible by other components of the computing device 102.

In some aspects of secure verification of a PUF, the PUF verifier 136 uses the HMAC engine 132 to compute a digest of the PUF key using known message data with the digest serving as a fingerprint of the underlying PUF key. The PUF verifier 136 may store this fingerprint or a portion of the fingerprint as the PUF reagent 130 in the OTP memory module 128, which will maintain the PUF reagent 130 through power cycles of the computing device 102. In some implementations, each time the computing device 102 or security module 126 boots up, the PUF verifier 136 obtains a new key from the PUF 134, recomputes the digest of the PUF key, and compares at least a portion of the PUF key digest with a corresponding portion of the fingerprint or PUF reagent 130 retrieved from the OTP memory. If the PUF verifier determines that the digest matches the reagent, the PUF 134 is verified without exposing the PUF key and the security module 126 can enable cryptographic functions of the device and/or allow the device to boot, such as by executing the boot ROM 122 to boot the boot image 124 of the computing device. Alternatively, if the PUF verifier 136 determines that the digest does not match the reagent, the PUF verifier can signal that the PUF key has changed and should not be used for silicon reliability or security concerns. The implementation and use of the PUF verifier 136 varies and are described throughout the disclosure.

Although not shown, the PCBA 114 may also include I/O ports, a graphics processing unit, and various data interfaces. Generally, the I/O ports allow the computing device 102 to interact with other devices, peripherals, or users. For example, the I/O ports may include or be coupled with a universal serial bus, human interface devices, audio inputs, audio outputs, or the like. The GPU processes and renders graphics-related data for the computing device 102, such as user interface elements of an operating system, applications, or the like. In some cases, the GPU accesses a portion of local memory to render graphics or includes dedicated memory for rendering graphics (e.g., video RAM) of the PCBA 114.

The data interfaces of the computing device 102 provide connectivity to one or more networks and other devices connected to those networks. The data interfaces may include wired interfaces, such as Ethernet or fiber optic interfaces for communications over a local network, an intranet, or the Internet. Alternately or additionally, the data interfaces may include wireless interfaces that facilitate communication over wireless networks, such as wireless LANs, wide-area wireless networks (e.g., cellular networks), and/or wireless personal-area-networks (WPANs). Any data communicated through the I/O ports or the data interfaces of the computing device may be encoded or decoded using cryptographic functions that rely on keys generated or derived from the PUF 134.

Figure 2:
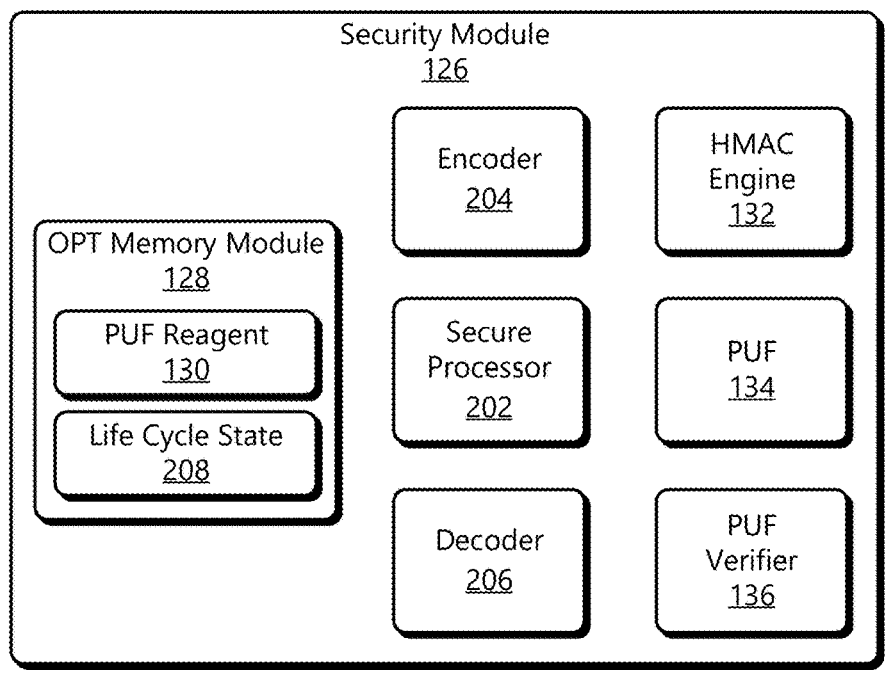
FIG. 2 illustrates an example security module that includes components that may implement aspects of secure verification of a PUF.

FIG. 2 illustrates at 200 an example security module that includes components that may implement aspects of secure verification of a PUF. Although shown as combined, the security module 126 and OTP memory module 128 may be implemented separately or with different combinations of components. The illustrated security module 126 and OTP memory module 128 may represent intellectual property (IP) cores, IP macros, IP blocks, or any other suitable unit of circuitry (e.g., logic, cells, chip layout/nets). Alternately or additionally, each or both of the security module 126 and OTP memory module 128 may be implemented as part of a system-on-chip (SoC), application-specific standard part (ASSP), digital signal processor (DSP), programmable SoC (PSoC), or field-programmable gate array (FPGA).

The security module 126 may include a secure processor 202, an encoder 204, and a decoder 206. The secure processor 202 may include any suitable type of processor configured to execute secure firmware or ROM code, such as code from an instruction ROM (iROM, not shown) of the secure processor. Generally, the secure processor 202 may execute code or firmware to implement various security functions, which may include a secure boot procedure, root-of-trust verification, cryptographic functions, signature verification, key generation, and so forth. The encoder 204 and decoder 206 can enable various data encoding-related operations and may implement any suitable type of error-detection codes or error-correction codes (ECCs). For example, the encoder 204 and decoder 206 may be configured to implement a Reed-Solomon code, a Golay code, a Bose-Chaudhuri-Hocquenghem (BCH) code, a Hamming code, a multidimensional parity code, or the like. In this example, the security module 126 also includes instances of an HMAC engine 132, PUF 134, and PUF verifier 136, which may interact with the secure processor 202, encoder 204, and decoder 206 to provide various aspects of secure verification of a PUF.

The OTP memory module 128 may include any suitable combination of OTP memory (e.g., electronically programmed fuses (e-fuses)), control logic, registers, and/or programming interfaces. Access to or permissions of each entity of the OTP memory can be provisioned or configured differently. For example, control and status registers may be configured for read/write access. Alternately, programming interfaces and sections of the OTP memory can be configured as write-only to prevent contents of these entities from being accessed (e.g., by firmware or via programming interfaces).

In this particular example, the OTP memory (not shown) of the OTP memory module 128 includes the PUF reagent 130 and a life cycle state 208. The life cycle state 208 (LCS 208) may include a value or data field configured to track a life cycle state of a chip or PCBA on which the OTP memory module 128 is embodied. For example, a value or cells of the life cycle state 208 can be altered after completion of various manufacturing stages to enable or disable particular functions of the chip or PCBA. For example, after the PCBA 114 is assembled and the PUF reagent value 130 is stored to OTP memory, the LCS register value can be altered to disable programming, diagnostic, and testing ports (e.g., Joint Test Action Group (JTAG) ports).

Generally, the OTP memory of the OTP memory module 128 may be implemented as any suitable number of registers or banks of OTP memory cells. In some cases, the OTP memory cells comprise fuses or anti-fuses that are irreversibly burned to store data or information in the OTP memory. In some implementations, the OTP memory module 128 may also store a universally unique identifier (UUID) and/or root keys of the PCBA 114, processor 116, or a system composed of one or more components of the PCBA 114. For example, a UUID or root keys of the PCBA 114 or computing device 102 may be derived based on a key provided by the PUF 134 and stored to the OTP memory module 128.

Figure 3:
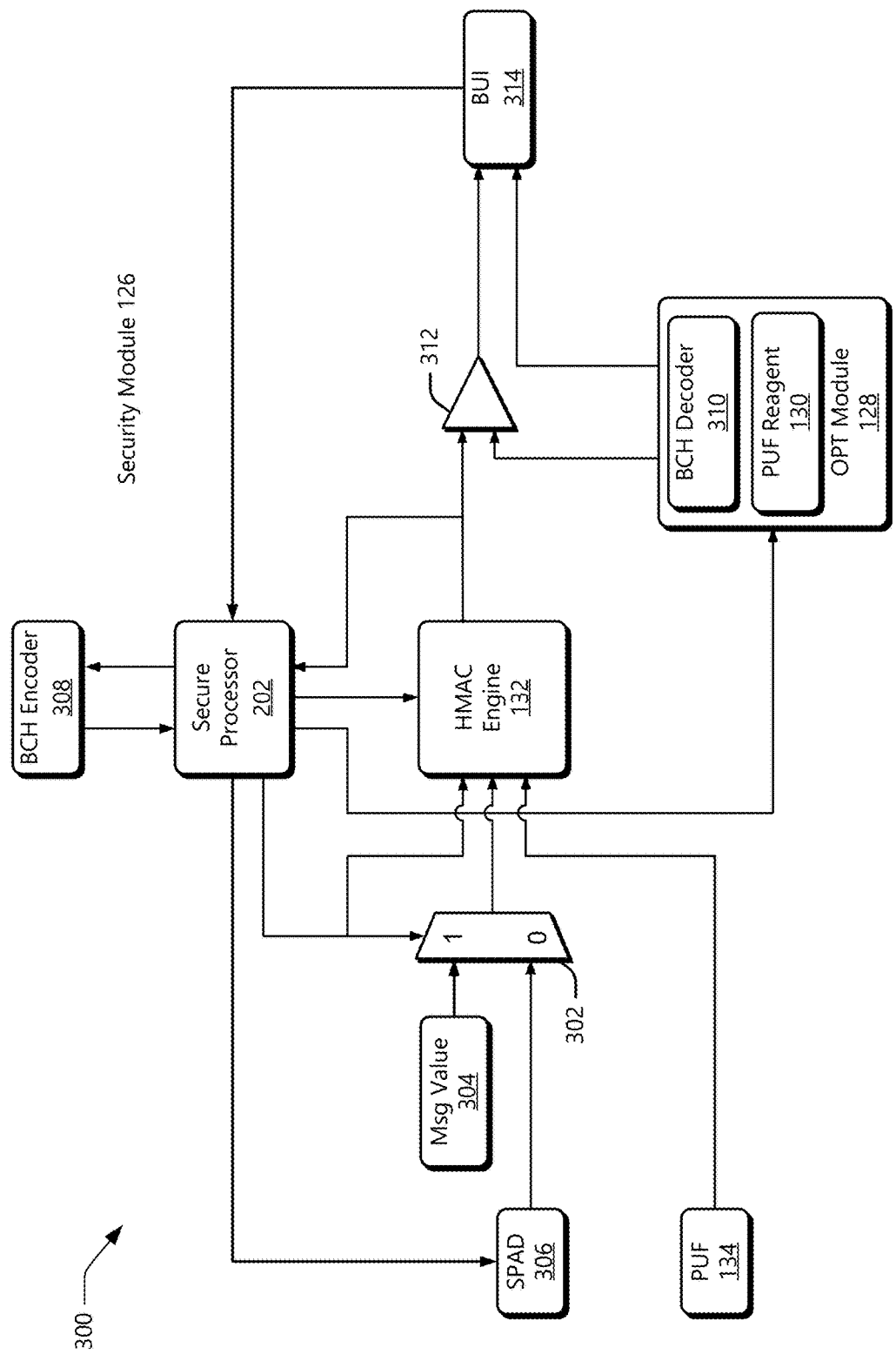
FIG. 3 illustrates an example configuration of a security module that includes circuitry for secure verification of a PUF implemented in accordance with one or more aspects.

FIG. 3 illustrates at 300 an example configuration of a security module that includes circuitry for secure verification of the PUF implemented in accordance with one or more aspects. In some implementations, the PUF verifier 136 includes PUF verification hardware or circuitry that is operably coupled with components of the security module 126 and OTP memory module 128. Alternatively or additionally, the PUF verifier 136 may include code or instructions (e.g., iROM) executed by the secure processor 202 that, responsive to execution, implement, direct, or coordinate operations for PUF verification. As such, the PUF verifier 136 be implemented with a combination of hardware and ROM instructions, which may simplify and secure the PUF verification process.

As shown in FIG. 3, the security module 126 may be configured with a multiplexor 302 (mux 302) operably coupled between a secure processor 202 and HMAC engine 132. In aspects, the secure processor 202 (e.g., an embedded hardware security module (eHSM)) can provide a message value 304 to the multiplexor 302 for use by the HMAC engine 132 to provide hash digests of the message value and a PUF key value. The security module 126 may also include a scratch pad memory 306 (SPAD 306) operably coupled between the secure processor 202 and the HMAC engine 132. To ensure security of the PUF key values, the PUF 134 can be directly coupled to the HMAC engine without a register or bus interface to prevent exposure of the PUF key values to other entities of the security module 126. For example, when an eHSM generates a PUF aging reagent, the message value is written to SPAD memory by secure processor 202 first, then the message value is sent to HMAC for digest computation. In implementations, the message value 304 is used only when verifying the PUF agent reagent value during boot up of the device.

In aspects, an output of the HMAC engine 132 is coupled to the secure processor 202 and the HMAC engine 132 may provide a hash digest of the PUF key and the message value to the secure processor. In some cases, the secure processor 202 selects a portion of the hash digest as a PUF reagent value and uses a BCH encoder 308 to generate ECC parity bits or information for the PUF reagent value. An output of the secure processor 202 may be coupled to an input of the OTP memory module 128 by which the secure processor can provide a the PUF reagent value 130 (and parity data) to the OTP memory module. In some implementations, the OTP memory module 128 includes a BCH decoder 310, which may provide error correction for the PUF reagent value 130.

The security module 126 may also include a comparator 312 for PUF verification having inputs coupled to the HMAC engine 132 and the OTP memory module 128. During PUF verification operations, the HMAC engine 132 can provide a hash digest of a PUF key to the comparator and the OTP memory module 128 can provide a PUF reagent value 130 or an error corrected-PUF reagent value (not shown). Based on a comparison of the hash digest and PUF reagent value, the comparator 312 can be configured to provide a result of the comparison, as a result of PUF verification, to a bus interface unit 314 (BUI 314) of the security module 126. In aspects, the bus interface unit is coupled to the secure processor 202 and may provide indications of the result of the PUF verification process to the secure processor 202 or a higher-level entity of a computing device 102. By so doing, the security module 126 can indicate whether the PUF has been securely verified before proceeding with cryptographic functions that rely on PUF keys.

Techniques for Secure Verification of a PUF

The following discussion describes techniques for securely verifying a PUF, which may enable a security module to securely verify operation of a PUF and key values provided by the PUF of the security module. These techniques may be implemented using any of the environments and entities described herein, such as the security module 126, OTP memory module 128, HMAC 132, PUF 134, and/or the PUF verifier 136. These techniques include various methods illustrated in FIGS. 4-6 and 10, each of which is shown as a set of operations that may be performed by one or more entities.

These methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to implement secure verification of the PUF by deriving a PUF reagent value that is stored in OTP memory of a security module, which is then used to verify accuracy of the PUF during subsequent power-on events of a device in which the security module is embodied. In portions of the following discussion, reference will be made to the operating environment 100 of FIG. 1 and various entities or configurations of FIGS. 2 and 3 by way of example. Such reference is not to be taken as limiting described aspects to the operating environment 100, entities, or configurations, but rather as illustrative of one of a variety of examples. Alternately or additionally, operations of the methods may also be implemented by or with entities described with reference to the System-on-Chip of FIG. 13.

Figure 4:
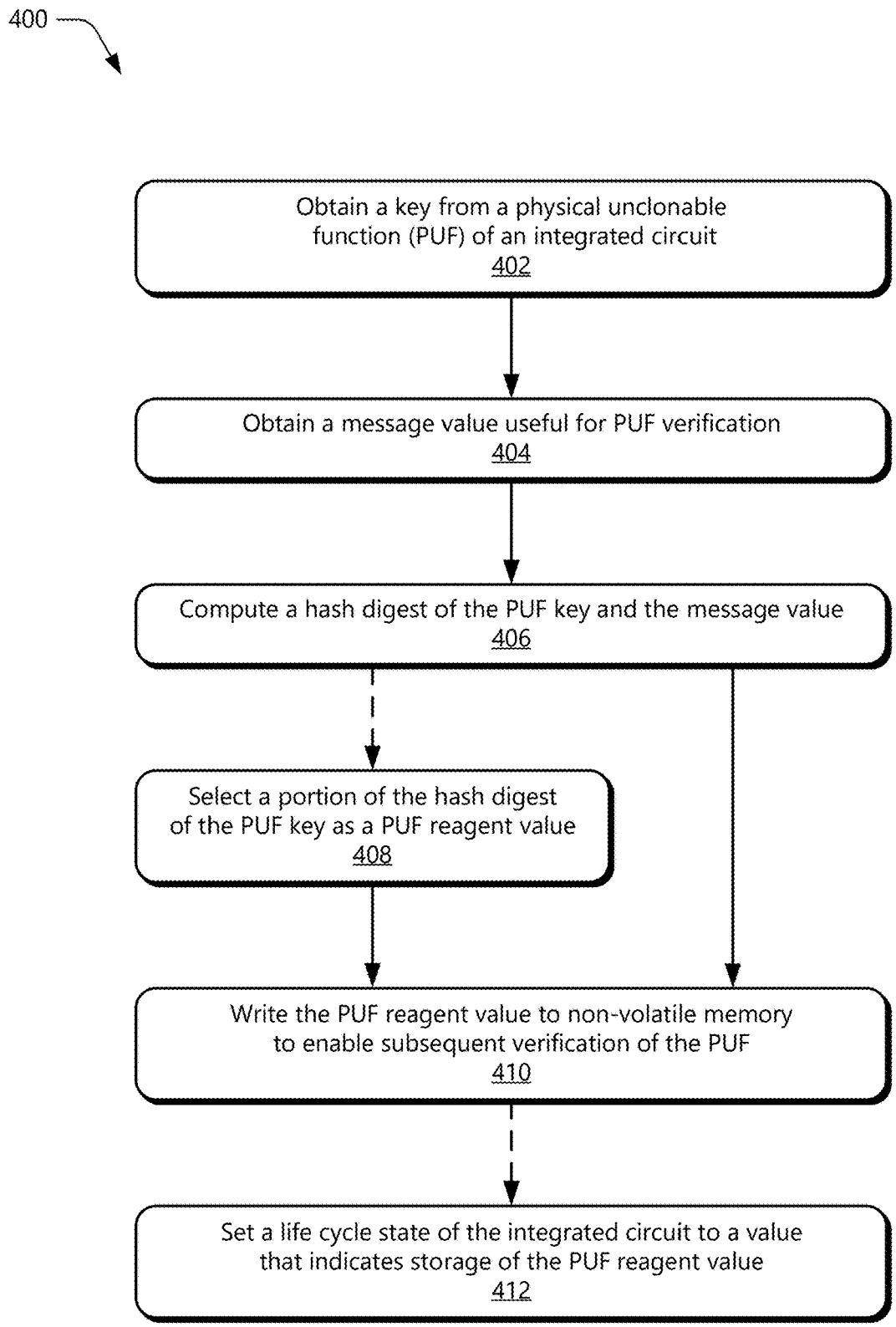
FIG. 4 depicts an example method for generating a PUF reagent value for secure verification in accordance with one or more aspects.

FIG. 4 depicts an example method 400 for generating a PUF reagent value for secure verification in accordance with one or more aspects, including operations performed by or with a security module 126, an OTP memory module 128, an HMAC 132, a PUF 134, and/or a PUF verifier 136.

At 402, a PUF verifier obtains a key from a PUF of an integrated circuit. The PUF verifier may direct or cause a PUF of the integrated circuit to generate or provide a key value. The PUF key value may include any suitable number of bits (e.g., 256 bits) or words, with a number of bits that range from 32 bits to 1024 bits. In aspects, the PUF key value is generated and provided directly to a one-way cryptographic block or process such that the PUF key value is not exposed during the generation, transfer, or use of the PUF key. Thus, the verification process for the PUF is secure and does not expose the PUF key to any other entities of a device in which the integrated circuit is embodied.

At 404, the PUF verifier obtains a message value useful for PUF verification.

The message value may be associated with or configured specifically for the process to securely verify the PUF. The message value may include any suitable number of bits (e.g., 512 bits) or words, for example, a number of bits that range from 32 bits to 1024 bits. In some cases, the message value includes a predefined value or message pattern. In such cases, the message value may include a predefined pattern of bit values that repeats at least one time within the message value. For example, the message value may includes one or more words of the hexadecimal value "5A" (e.g., 0x5A5A5A5A), which results in a message value that is symmetrical or same regardless of whether the integrated circuit employs big-endian or little-endian formatting or syntax.

At 406, the PUF verifier computes a hash digest of the PUF key and message value. The PUF verifier may use any suitable hashing algorithm (e.g., SHA-2, SHA-3) or block cipher (e.g., AES) to compute a hash digest of the PUF key and the message value. In some implementations, the PUF verifier uses an HMAC engine to compute a SHA-2 256 HMAC digest based on the PUF key and the message value. In aspects, the PUF verifier causes or implements a transfer of the PUF key value directly from an output of the PUF to an input of the cryptographic hash function. For example, the PUF key value is provided to the cryptographic hash function via a dedicated path, such as a non-public or non-accessible data bus. In other words, the PUF verifier maintains the PUF key as a secret value that is not exposed to or accessible by any other component of the integrated circuit. Additionally, the PUF verifier may use an encoding block to generate ECC parity information for the PUF reagent value.

Optionally at 408, the PUF verifier selects a portion of the hash digest of the PUF key as a PUF reagent value. The hash digest of the PUF key may include any suitable number of bits (e.g., 256 bits) or words (eight words), with a number of bits that range from 64 bits to 512 bits. In some aspects, the hash digest of the PUF key and message value includes at least 128 bits and the PUF verifier selects of at least a portion of the hash digest as the PUF reagent value, where the portion may include eight bits, 16 bits, 32 bits, 64 bits, or the like.

At 410, the PUF verifier writes the PUF reagent value to non-volatile memory of the integrated circuit to enable subsequent verification of the PUF. In some implementations, the non-volatile memory of the integrated circuit includes a one-time programmable fuse-based memory of the integrated circuit or a security module. Additionally, the PUF verifier may write ECC parity information for the PUF reagent value to the non-volatile memory of the integrated circuit. In some aspects, the PUF verifier may also verify accuracy of the PUF reagent value written to the non-volatile memory using the ECC information. For example, the PUF verifier may read the PUF reagent value and ECC information from the non-volatile memory, perform error correcting on the PUF reagent value using the ECC information to provide an error corrected-PUF reagent value, and compare the PUF reagent value with the error corrected-PUF reagent value to verify the PUF reagent value written to the non-volatile memory.

Optionally at 412, a life cycle state of the integrated circuit is set to a value that indicates storage of the PUF reagent value. This may include advancing the life cycle state from a production or provisioning setting to a deployment or field setting to lock, restrict, or limit access to the integrated circuit (e.g., disable debug access). For example, the PUF verifier or another provisioning agent of the integrated circuit may burn OTP memory fuses to advance a monotonic field or value to a deployment state after storage of the PUF reagent value. By so doing, the PUF verifier may prevent the PUF reagent value from being accessed or manipulated, further increasing security of subsequent PUF verification operations that rely on the PUF reagent value.

Figure 5:
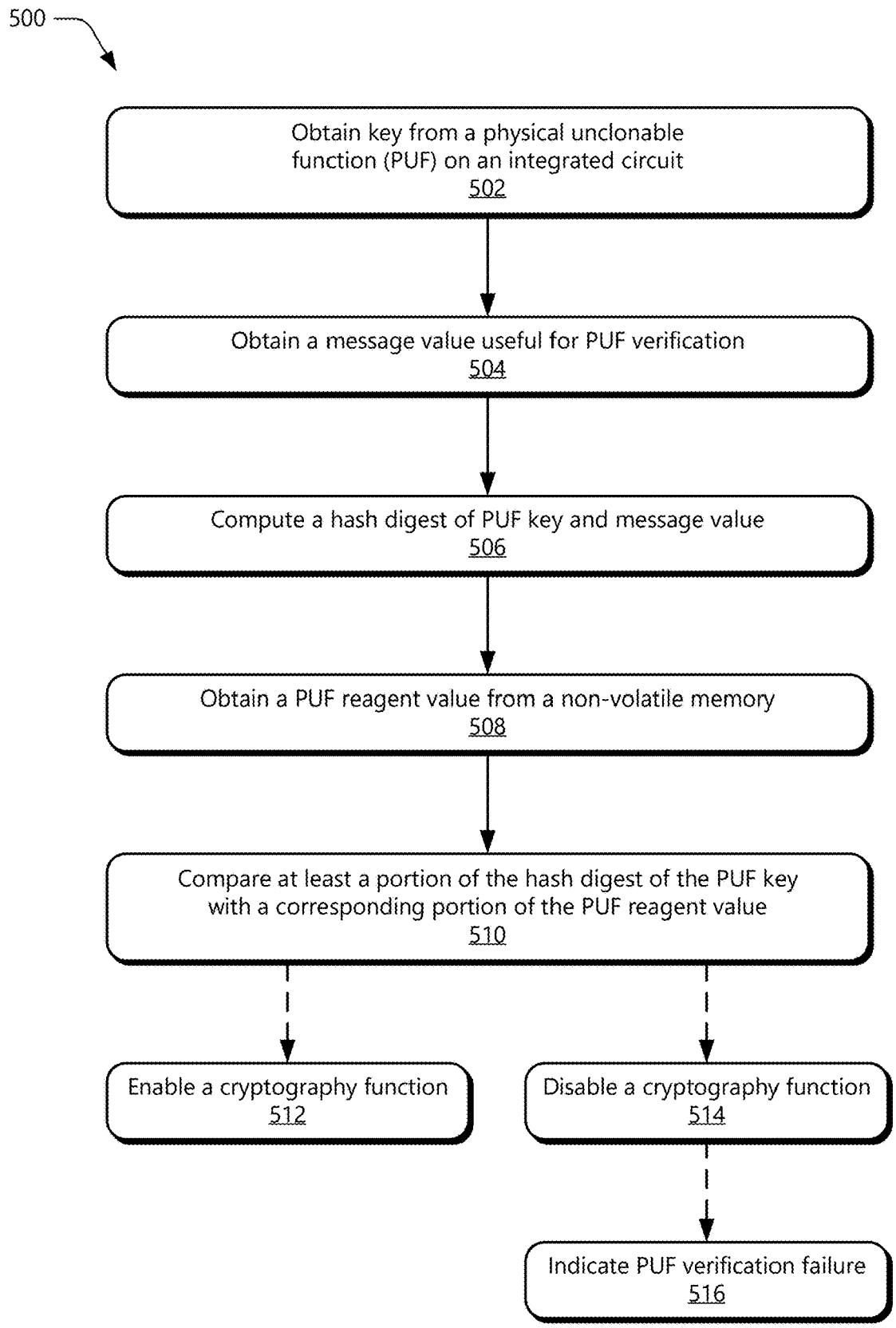
FIG. 5 depicts an example method for securely verifying a PUF using a PUF reagent value in accordance with one or more aspects.

FIG. 5 depicts an example method 500 for securely verifying a PUF using a PUF reagent value in accordance with one or more aspects, including operations performed by or with a security module 126, an OTP memory module 128, an HMAC 132, a PUF 134, and/or a PUF verifier 136.

At 502, the PUF verifier obtains a key from a PUF of an integrated circuit. The PUF verifier may direct or cause a PUF of the integrated circuit to generate or provide a key value. The PUF key value may include any suitable number of bits (e.g., 256 bits) or words, with a number of bits that range from 32 bits to 1024 bits. In aspects, the PUF key value is generated and provided directly to a one-way cryptographic block or process such that the PUF key value is not exposed during the generation, transfer, or use of the PUF key.

At 504, the PUF verifier obtains a message value useful for PUF verification. The message value may be associated with or configured for the process to securely verify the PUF. The message value may include any suitable number of bits (e.g., 512 bits) or words (e.g., 16 words), for example, a number of bits that range from 32 bits to 1024 bits. In some cases, the message value includes a predefined value or message pattern. In such cases, the message value may include a predefined pattern of bit values that repeats at least one time within the message value (e.g., 0x5A5A5A5A).

At 506, the PUF verifier computes a hash digest of the PUF key and the message value. The PUF verifier may use any suitable hashing algorithm (e.g., SHA-2, SHA-3) or block cipher (e.g., AES) to compute a hash digest of the PUF key and the message value. In some implementations, the PUF verifier uses an HMAC engine to compute a SHA-2 256 HMAC digest based on the PUF key and the message value. In aspects, the PUF verifier causes or implements a transfer of the PUF key value directly from an output of the PUF to an input of the cryptographic hash function.

At 508, the PUF verifier obtains a PUF reagent value from a non-volatile memory of the integrated circuit. In some implementations, the PUF verifier obtains the PUF reagent value from an OTP memory module of the integrated circuit. In aspects, the PUF verifier can also obtain error-correcting code information for the PUF reagent value from the non-volatile memory or OTP memory module and perform error correcting on the PUF reagent value using the ECC information to provide an error corrected-PUF reagent value. Alternatively, the PUF verifier can indicate, in response to failure of the error correcting, an uncorrectable error in the PUF reagent value and prevent verification of the PUF.

At 510, the PUF verifier compares at least a portion of the hash digest of the PUF key with a corresponding portion of the PUF reagent value. The PUF verifier may compare the hash digest with the PUF reagent value when both include the same number of bits. In some cases, the PUF verifier compares the portion of the hash digest with a corresponding portion of the error corrected-PUF reagent value. In some implementations, the PUF verifier compares a word of the hash digest (e.g., last word) with the PUF reagent (e.g., a word of the PUF reagent) or a corresponding portion of the PUF reagent (e.g., a last word of the PUF reagent). In other words, the PUF verifier compares bits of the PUF reagent value to those bit positions of the current hash digest that correspond to the initial hash digest bits from which PUF reagent was formed (e.g., operation 408).

From operation 510, the method 500 may proceed to 512 in response to verifying the PUF or proceed to 514 in response to failing to verify the PUF. At 512, the PUF verifier enables, based on a successful PUF verification, a cryptography function of the integrated circuit that uses a key value provided by the PUF of the integrated circuit. Alternatively, the PUF verifier may enable a boot process or other secure functions related to the integrated circuit based on verification of the PUF. In some cases, the PUF verifier indicates verification of the PUF to a higher-level system entity (e.g., firmware or operating system) in response to the portion of the hash digest of the PUF key matching the corresponding portion of the PUF reagent value.

At 514, the PUF verifier disables the cryptography function of the integrated circuit that uses the key value provided by the PUF of the integrated circuit. In other words, because the PUF or PUF keys cannot be verified, the PUF verifier prevents use of cryptographic functions that rely on the PUF keys. Optionally at 516, the PUF verifier may indicate failure of PUF verification to a higher-level system of the device.

Figure 6:
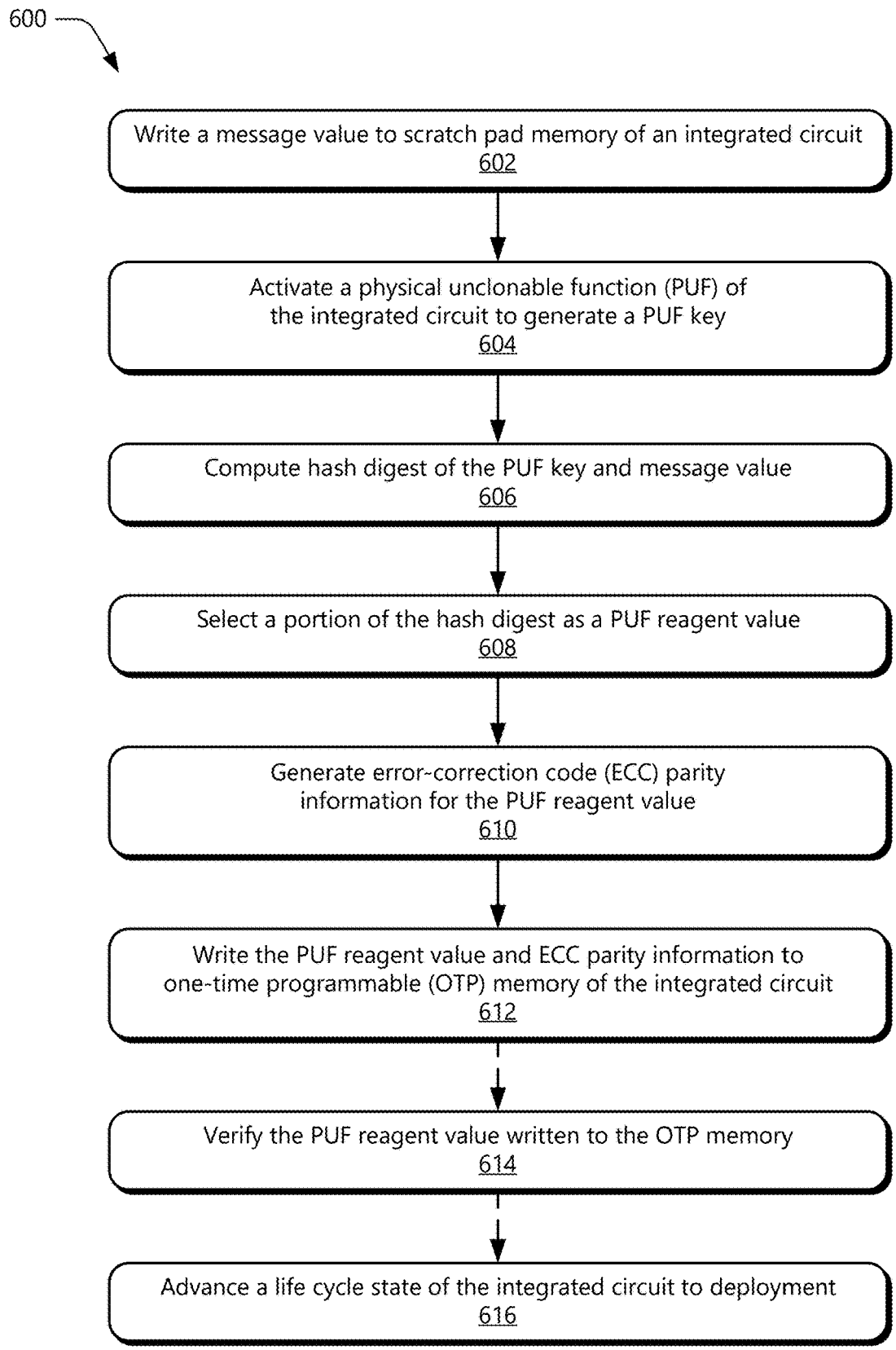
FIG. 6 depicts an example method for generating a PUF reagent value with error-correction code information in accordance with one or more aspects.

FIG. 6 depicts an example method 600 for generating a PUF reagent value with error-correction code information in accordance with one or more aspects, including operations performed by or with a security module 126, an OTP memory module 128, an HMAC 132, a PUF 134, and/or a PUF verifier 136. By way of example, the operations of method 600 may be described with reference to FIGS. 7-9, which illustrate the operations in the context of a security processor and timing diagrams of operations among components of the security processor in accordance with one or more aspects.

At 602, a message value is written to a scratch pad memory of an integrated circuit. A secure processor of the integrated circuit may write the message value to the scratch pad memory. The message value may include any suitable number of bits (e.g., 512 bits) or words (e.g., 16 words), for example, a number of bits that range from 32 bits to 1024 bits. In some cases, the message value includes a predefined value or message pattern. By way of example, consider FIG. 7 which illustrates example operations for securely verifying the PUF in the context of the security module of FIG. 3. With reference to operation 602, the secure processor 202 writes 512 bits of the patterned message "0x5A5A5A5A" to the scratch pad memory 306. For convenient reference, FIG. 7 may include indicators that refer to the various operations of the methods 700 and 1000 that relate to the generation and use of the PUF reagent and other data related to secure verification of the PUF.

Figure 8:
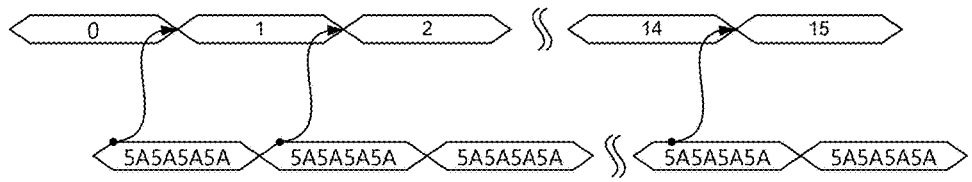
FIG. 8 illustrates example timing diagrams for generating a PUF reagent value and associated parity information in accordance with one or more aspects.

As another example, FIG. 8 illustrates at 800 a timing diagram for a secure processor writing the "0x5A5A5A5A" message value to the scratch pad memory (SPAD memory). As described herein, the "0x5A5A5A5A" pattern has the property such that the message value is the same regardless of whether the secure processor and other components implement little-endian and big-endian syntax settings. As shown at 800, the secure processor can write the "0x5A5A5A5A" pattern 16 times to the scratch pad memory and the scratch pad memory address increments, either automatically or by the secure processor, by one with each write.

Figure 7:
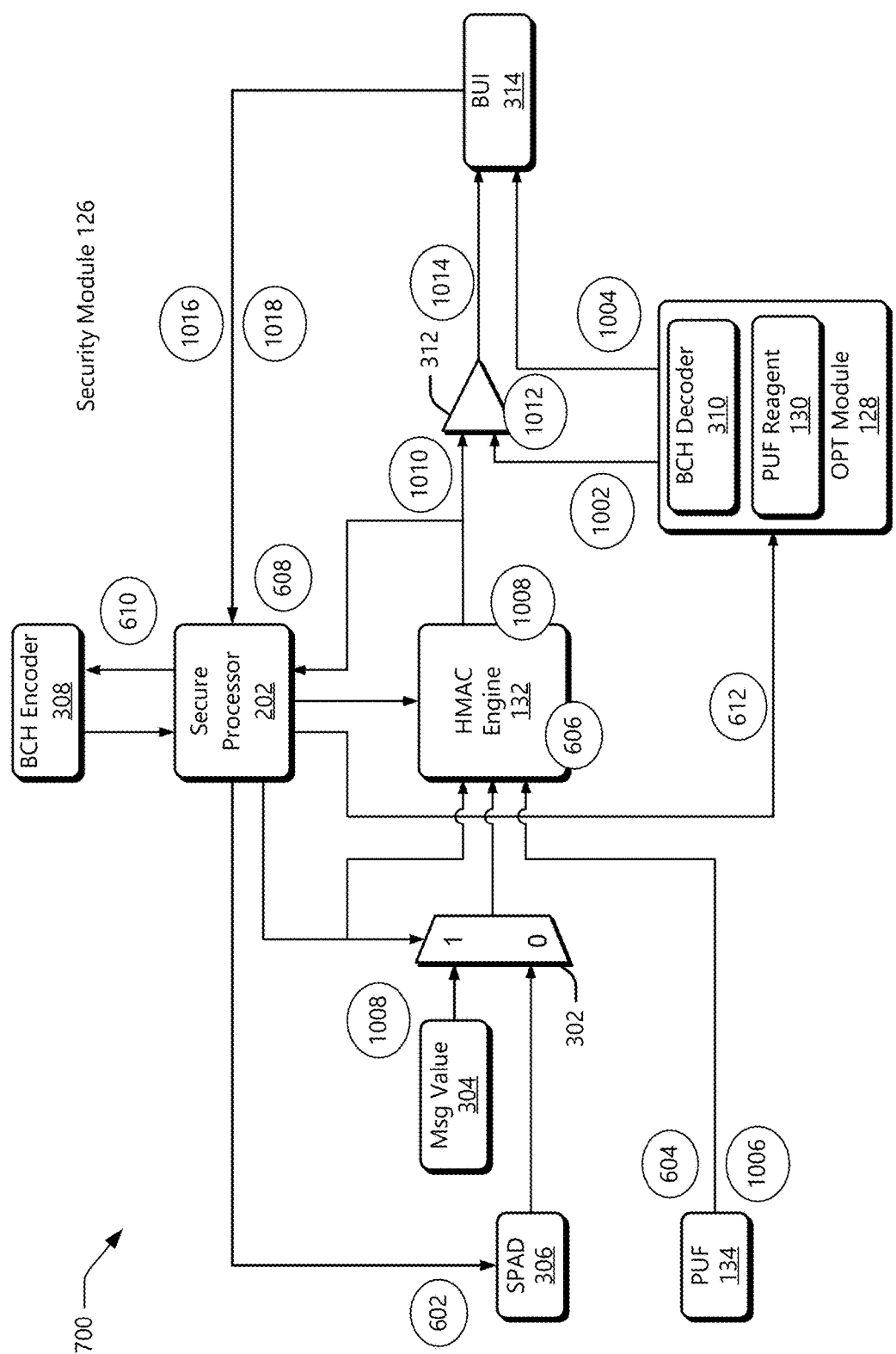
FIG. 7 illustrates example operations of securely verifying a PUF in the context of the security module of FIG. 3.

At 604, a PUF of the integrated circuit is activated to generate a PUF key. The secure processor of the integrated circuit may activate the PUF to provide or generate the PUF key value. The PUF may provide the PUF key value directly (e.g., direct wire or conductor interface) to a cryptography engine of the integrated circuit without the PUF key value passing through any register or bus that is accessible to other entities of the integrated circuit. In the context of FIG. 7, the secure processor 202 activates the PUF 134 to provide a PUF key value to the HMAC engine 132.

At 606, a hash digest of the PUF key and the message value is computed. The secure processor of the integrated circuit may use a cryptographic engine that implements any suitable hashing algorithm (e.g., SHA-2, SHA-3) or block cipher (e.g., AES) to compute the hash digest of the PUF key and the message value. In some implementations, an HMAC engine is used to compute a SHA-2 256 HMAC digest based on the PUF key and the message value. Continuing the example of FIG. 7, the secure processor 202 activates the HMAC engine 132 to compute a hash digest of the PUF key value and the message value provided by the multiplexor 302. As shown in the timing diagram 802 of FIG. 8, the secure processor starts the HMAC engine and provides the "0x5A5A5A5A" patterned message and the PUF key to the HMAC engine. The secure processor then waits for the HMAC engine to complete computation of the HMAC digest, which includes an eight word or 256-bit digest.

At 608, a portion of the hash digest is selected as a PUF reagent value. In aspects, the secure processor selects a portion or word of the hash digest provided by the cryptographic engine. In the context of FIG. 7, the secure processor selects the last word (e.g., word 7) of the eight-word hash digest provided by the HMAC engine 132 as a 32-bit PUF reagent value. At 610, ECC parity information is generated for the PUF reagent value. The secure processor may use a BCH encoder to generate the ECC parity information for the PUF reagent value. Continuing the example of FIG. 7, the secure processor 202 uses the BCH encoder 308 to generate 18 bits of parity information for the 32-bit PUF reagent value. Returning to FIG. 8, the timing diagram 806 illustrates the process for generating ECC parity information for the PUF reagent. In aspects, the secure processor programs the BCH encoder settings and provides the PUF reagent value as BCH user data. The secure processor then starts the BCH encoder to BCH encode the PUF reagent value and then waits for the BCH processor to complete the encoding. When finished, the BCH encoder provides the ECC parity data to the secure processor.

At 612, the PUF reagent value and ECC parity information are written to OTP memory of the integrated circuit. In aspects, the secure processor writes the PUF reagent value and ECC parity information to the OTP memory of the integrated circuit. Generally, the PUF reagent value and the ECC parity bits are burned to the OTP memory for subsequent verification of the PUF. Thus, the method 600 may be performed one time during provisioning or manufacture of a chip or device to enable secure verification of the PUF in the future. In the context of FIG. 7, the secure processor 202 writes the PUF reagent value 130 and parity bits (not shown) to the OTP memory module 128. Optionally at 614, the PUF reagent value written to the OTP is verified using the ECC parity information. For example, the secure processor may read the PUF reagent value and parity bits from the OTP memory, perform error correcting on the PUF reagent value with the BCH decoder using the parity bits to provide an error corrected-PUF reagent value, and compare the PUF reagent value with the error corrected-PUF reagent value to verify the PUF reagent value written to the OTP memory.

Figure 9:
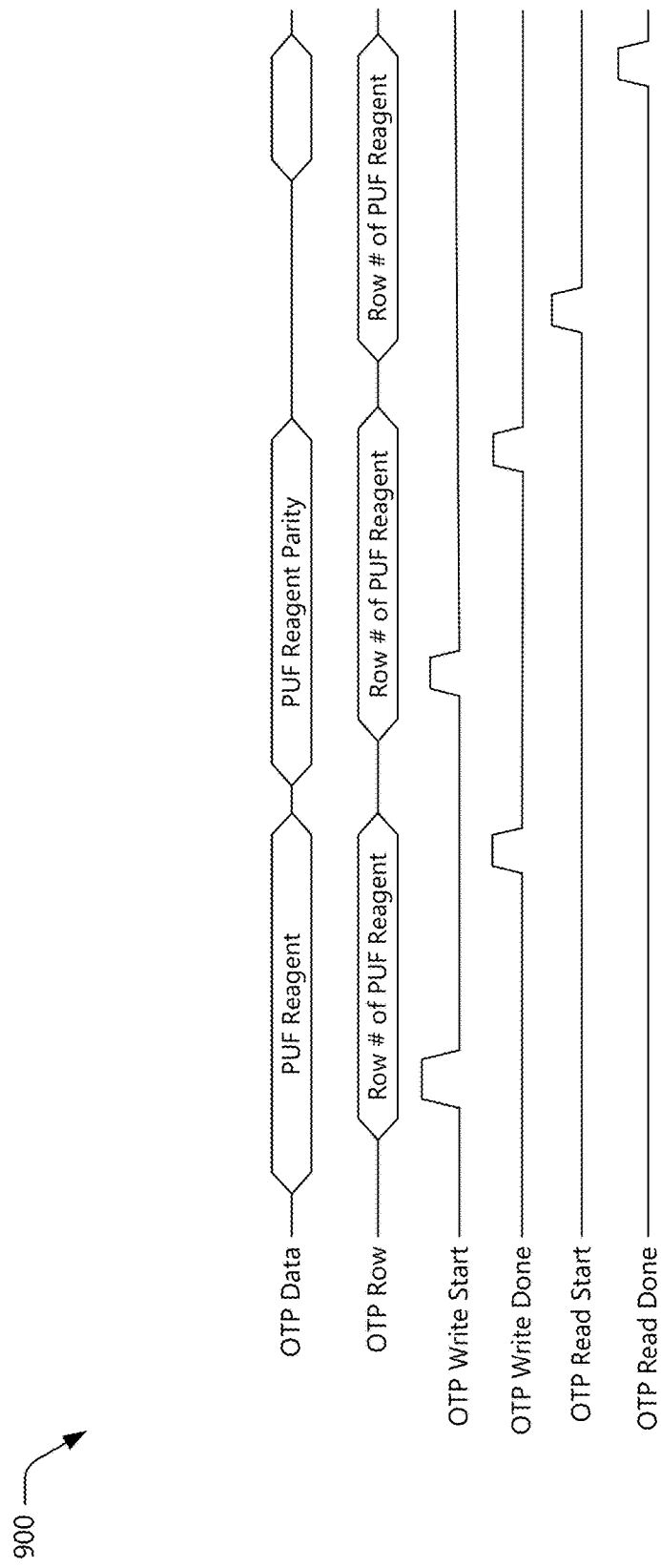
FIG. 9 illustrates an example timing diagram writing a PUF reagent value to OTP memory and verifying the PUF reagent value.

By way of example, consider FIG. 9 which illustrates at 900 an example timing diagram writing a PUF reagent value to OTP memory and verifying the PUF reagent value. The secure processor may manage operation of the OTP memory and BCH decoder to write the PUF reagent value to OTP and verify integrity of the PUF reagent in the OTP memory. To write the PUF reagent value, the secure processor programs the OTP memory module with the PUF reagent value and OTP row number for PUF reagent value. The secure processor then starts the OTP write operation and waits for the write operation of the PUF reagent value to complete. To read and verify the PUF reagent value the secure processor programs the OTP memory module with the row number for the PUF reagent value, starts the read of the PUF reagent value and waits for the read operation to complete. After the PUF reagent value is read, the secure processor can use the BCH decoder to error-correct the PUF reagent value and compare the error corrected-PUF reagent value to the PUF reagent value burned to the OTP memory module. In aspects, OTP memory module can automatically read the PUF reagent ECC parity bits, send the PUF reagent value with the ECC bits together to the BCH decoder, and then enable BCH decoder to error-correct the PUF reagent value. Based on the comparison, the secure processor (and/or BCH decoder) can verify accuracy of the OTP write operation or report an error out of the security module indicating that the writing of the PUF reagent value failed (e.g., security module fault).

Optionally at 616, a life cycle state of the integrated circuit is advanced to deployment. In aspects, the secure processor may alter a life cycle state value in the OTP memory to indicate that provisioning of the integrated circuit or security module is complete. By so doing, the secure processor may prevent the PUF reagent value from being accessed or manipulated, further increasing security of subsequent PUF verification operations that rely on the PUF reagent value. After the PUF reagent value is stored to OTP memory, the secure processor or PUF verifier may use the PUF reagent value to securely verify operation of the PUF of the security module, which is described in reference to FIG. 10.

Figure 10:
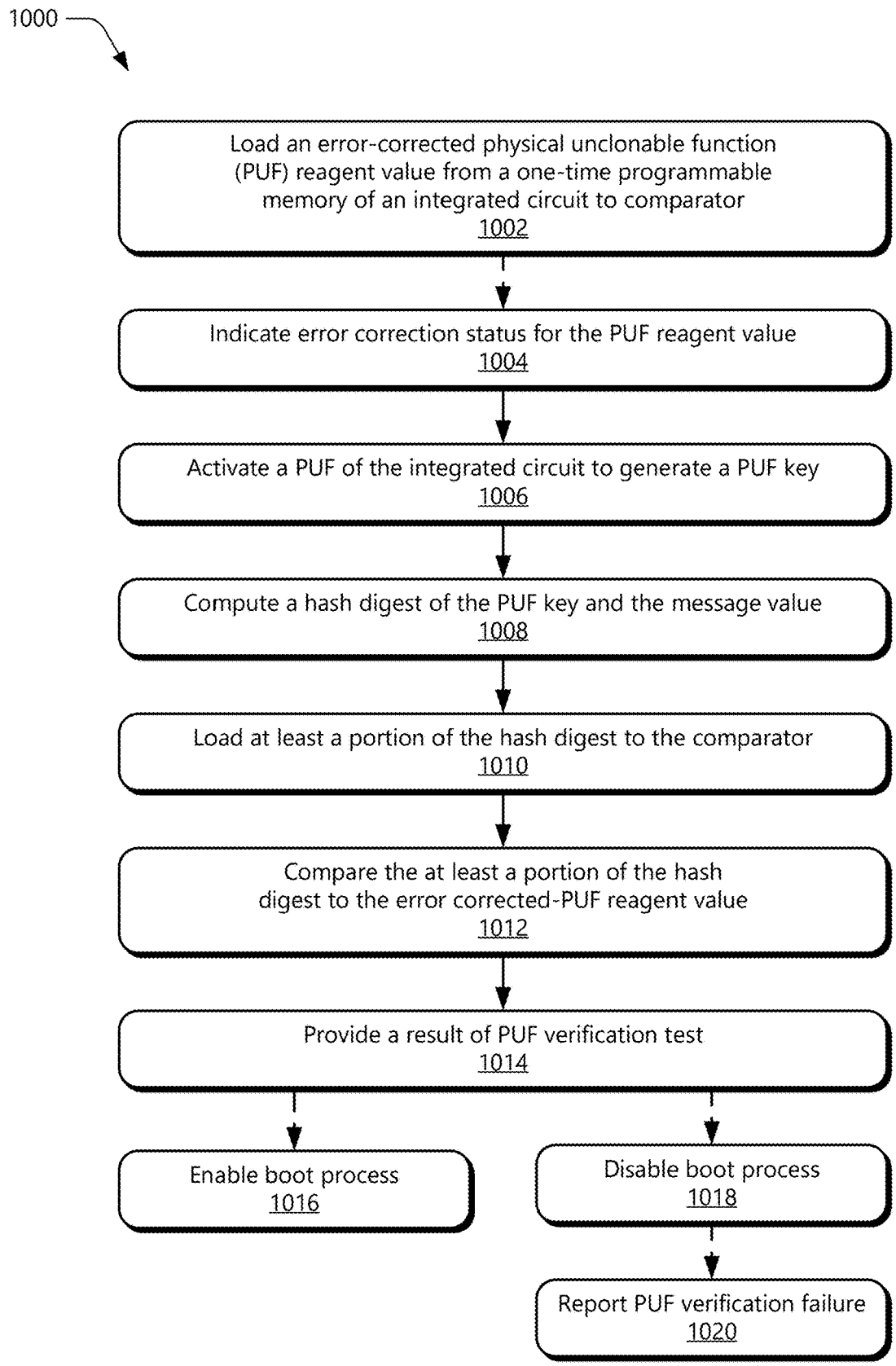
FIG. 10 depicts an example method for securely verification a PUF using a PUF reagent value and associated parity information.

FIG. 10 depicts an example method 1000 for secure verification of a PUF using a PUF reagent value and associated parity information, including operations performed by or with a security module 126, an OTP memory module 128, an HMAC 132, a PUF 134, and/or a PUF verifier 136. By way of example, the operations of method 1000 may be described with reference to FIGS. 7, 11, and 12, which illustrate the operations in the context of a security processor and timing diagrams of operations among components of the security processor in accordance with one or more aspects.

At 1002, an error corrected-PUF reagent value is loaded from an OTP memory of an integrated circuit to a comparator. The secure processor may initiate loading of the error corrected-PUF value from the OTP memory. For example, after a hardware reset or power-on event, the secure processor can direct the OTP memory module to initialize and perform error correction on a PUF reagent value read from OTP memory. Returning to FIG. 7, which illustrates the example operations for secure verification of the PUF, the secure processor 202 or a hardware reset circuit initiates a process for secure verification of the PUF and directs the OTP memory module 128 to read the PUF reagent value and use the BCH decoder 310 to perform error correction. The OTP memory module 128 then sends the error corrected-PUF reagent value to the comparator 312 for comparison with a hash digest of a current PUF reagent value.

Figure 11:
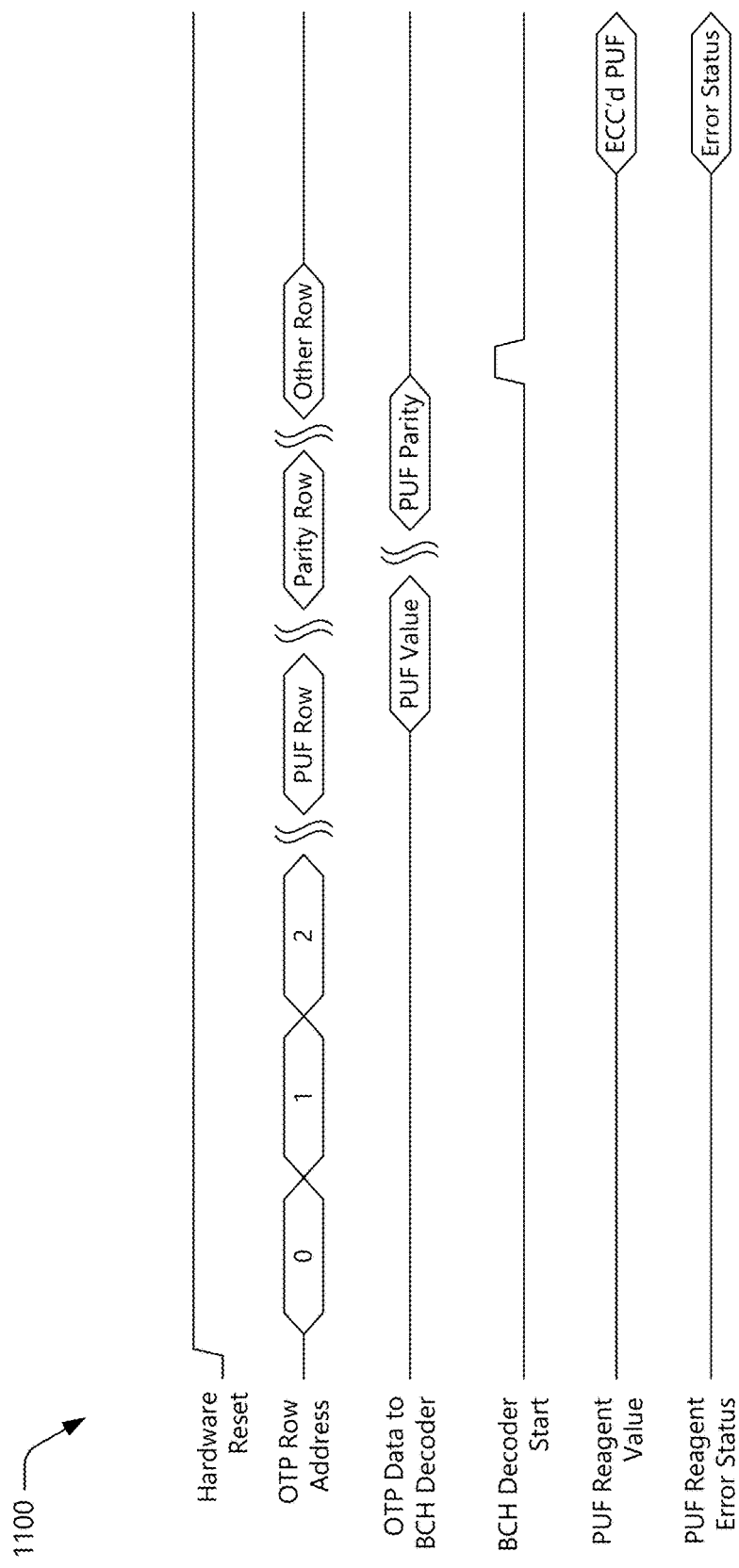
FIG. 11 illustrates an example timing diagram for accessing a PUF reagent value from an OTP memory.

As another example, FIG. 11 illustrates at 1100 a timing diagram for OTP access and error-correction of a PUF reagent value. After a hardware reset release, an OTP state machine can read through e-fuse rows of the OTP memory, performing a majority vote or ECC correction for all the OTP fields. After the OTP memory module reads the PUF reagent value and associated ECC information, the BCH decoders starts error correction of the PUF reagent value read from the OTP memory. After the BCH decoder completes error correction, the error corrected-PUF reagent value is available. The BCH decoder may also provide an error status for the error correction operation, for example, when error correction of the PUF reagent value fails.

Optionally at 1004, an error correction status for the PUF reagent value is indicated. The error status may be provided to the secure processor or a higher-level system of the device in which the integrated circuit is embodied, such as firmware or an operating system. Continuing the example of FIG. 7, the BCH decoder 310 can provide error status for the error correction of the PUF reagent value to the bus interface unit 314.

At 1006, a PUF of the integrated circuit is activated to generate a PUF key. In aspects, the secure processor can instantiate or initiate operation of the PUF to provide a PUF key value. The PUF key value may include any suitable number of bits (e.g., 256 bits) or words, with a number of bits that range from 32 bits to 1024 bits. In aspects, the PUF key value is generated and provided directly to a one-way cryptographic block or process such that the PUF key value is not exposed during the generation, transfer, or use of the PUF key. Continuing the example of FIG. 7, the secure processor 202 directs the PUF 134 to generate a key and provide the key to the HMAC 132.

At 1008, a hash digest of the PUF key and a message value is computed. The secure processor may provide the message value to the cryptographic block with the PUF key for computation of the hash digest. The cryptographic block may implement any suitable hashing algorithm (e.g., SHA-2, SHA-3) or block cipher (e.g., AES) to compute the hash digest of the PUF key and the message value. The hash digest may include any suitable number of bits, which may include 64 bits, 128 bits, 256 bits, 512 bits, 1024 bits, and so forth. In the context of FIG. 7, the secure processor 202 writes 512 bits of the patterned message "0x5A5A5A5A" to the HMAC 132 for use in generating the hash digest of the PUF key and the message value.

At 1010, at least a portion of the hash digest is loaded into the comparator. In aspects, the cryptographic block or secure processor provides a portion of the hash digest to the comparator. In various implementations, the portion of the hash digest selected as the PUF reagent value may include at least eight bits, at least 16 bits, at least 32 bits, or at least 64 bits of the hash digest. Alternatively or additionally, the portion of the hash digest selected as the PUF reagent value may range from approximately or at least 30 bits up to the full length of the hash digest (e.g., 30 bits to 256 bits). In other words, a portion of the hash digest is loaded into the comparator for comparison with a portion of the PUF reagent value. Thus, to accurately verify the PUF, the comparator does not need to compare the entire hash digest to the entire PUF reagent value due to cryptographic complexity of the hashing algorithm. Continuing the example of FIG. 7, the HMAC 132 selects and provides the last word (e.g., word 7 of words 0-7) of an eight-word hash digest computed by the HMAC engine 132 as the hash digest for comparison.

At 1012, the at least a portion of the hash digest is compared to the error corrected-PUF reagent value. In aspects, a comparator of the PUF verification circuitry compares the portion of the hash digest with a corresponding portion of the error corrected-PUF reagent value obtained from the OTP memory module. Generally, the PUF verification circuitry compares one or more words of the hash digest (e.g., last word) with the PUF reagent (e.g., a word of the PUF reagent) or a corresponding one or more words of the PUF reagent (e.g., a last word of the PUF reagent). In the context of FIG. 7, the comparator 312 compares the portion of the hash digest provided by the HMAC 132 with the error corrected-PUF reagent value provided by the OTP memory module 128.

At 1014, a result of the PUF verification is provided based on the comparison of the hash digest and the error corrected-PUF reagent value. The comparator may provide an indication of the result of the PUF verification to a bus interface unit of the integrated circuit. Continuing the example of FIG. 7, the comparator 312 provides a result of the PUF verification process to the bus interface unit 314 of the security module 126. From operation 1014, the method 1000 may proceed to 1016 in response to verifying the PUF of the integrated circuit or proceed to 1018 in response to failing to verify the PUF of the integrated circuit. Concluding the example of FIG. 7, the bus interface unit 314 indicates the result of the PUF verification process to the secure processor 202 of the security module 126.

At 1016, a boot process of the device is enabled based on successful verification of the PUF of the integrated circuit. In aspects, the secure processor or security module may enable or permit a boot process of the device to proceed in response to successful verification of the PUF of the security module. For example, the security module may initiate a secure boot process or root-of-trust key generation in response to determining that the PUF of the security module is operating properly and/or accurately. Alternatively or additionally, the secure processor may enable one or more cryptographic functions of the security module that use or rely on the PUF to provide key values for various secure operations.

At 1018, the boot process of the device is disabled based on failing to verify the PUF of the integrated circuit. In aspects, the secure processor or security module may disable or prevent a boot process of the device in response determining that the PUF failed verification and/or that the security module is not secure. In some cases, the security module may enter a protection mode or panic mode, which may include halting module activity, resetting the module, and/or wiping all cryptographic information from volatile memories of the module.

Optionally at 1020, failure of the PUF verification process is reported to a higher-level system of the device. The security module may report failure of PUF verification to firmware or an operating system of the device. By so doing, a user or technician may be alerted to the failure of PUF verification to enable troubleshooting or another attempt at PUF verification. For example, when extreme temperature or over voltage results in failure of PUF verification, a user may restart the device after a duration of time to reattempt PUF verification (e.g., after a decrease in device temperature). In other situations, when the PUF fails due to microelectronic aging, the issue can be quickly diagnosed as the root cause of device or security module failure.

Figure 12:
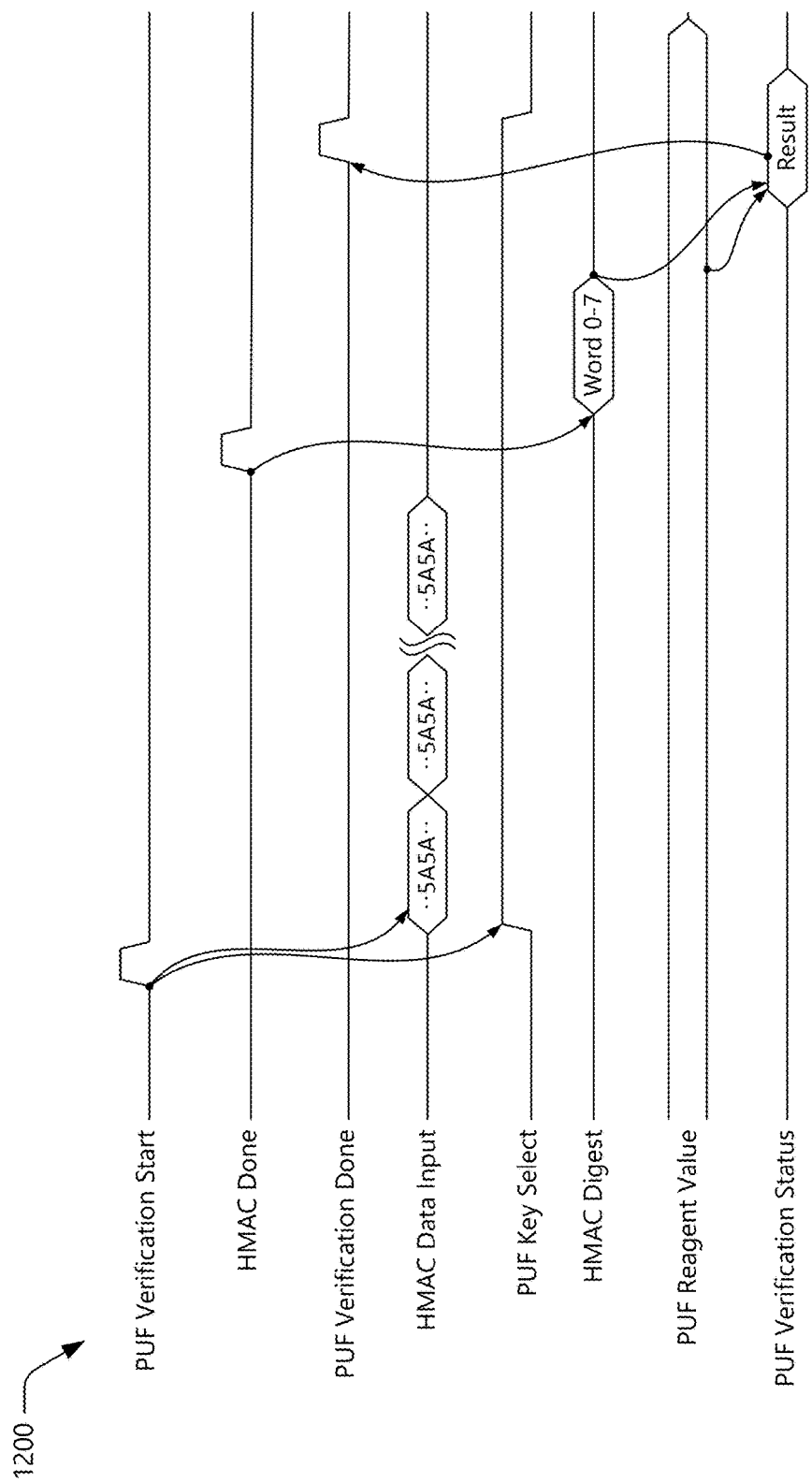
FIG. 12 illustrates an example timing diagram for secure verification of a PUF using a hash digest of a PUF key and a PUF reagent value.

As an example of operations 1006 through 1018, consider FIG. 12 which illustrates at 1200 a timing diagram for the PUF verification process. The secure processor of the security module can initialize the PUF verification test. The PUF verification test starts by computing the hash digest using the PUF key value and the 512 bits of the fixed pattern "0x5A5A5A5A" message. The hash digest is compared to the PUF reagent value to generate a PUF verification test result, which is read by the secure processor. If the PUF verification is successful, the secure processor and firmware will continue to a boot process of the device. Alternatively, if the PUF verification fails (or times out), the secure processor prevents the silicon from booting up and the PUF failure can be diagnosed as the root cause of boot failure based on failure of the PUF verification process.

Thus, the process to securely verify the PUF can ensure that the same PUF keys are provided by the PUF of the security module. In the event of silicon aging effects or random hardware faults, the PUF can be quickly identified as the root cause based on the failure of the PUF verification process. This would otherwise be difficult to determine due to the o the inaccessibility of the PUF key by the nature of the PUF implementation for security purposes.

System-on-Chip and Controller

Figure 13:
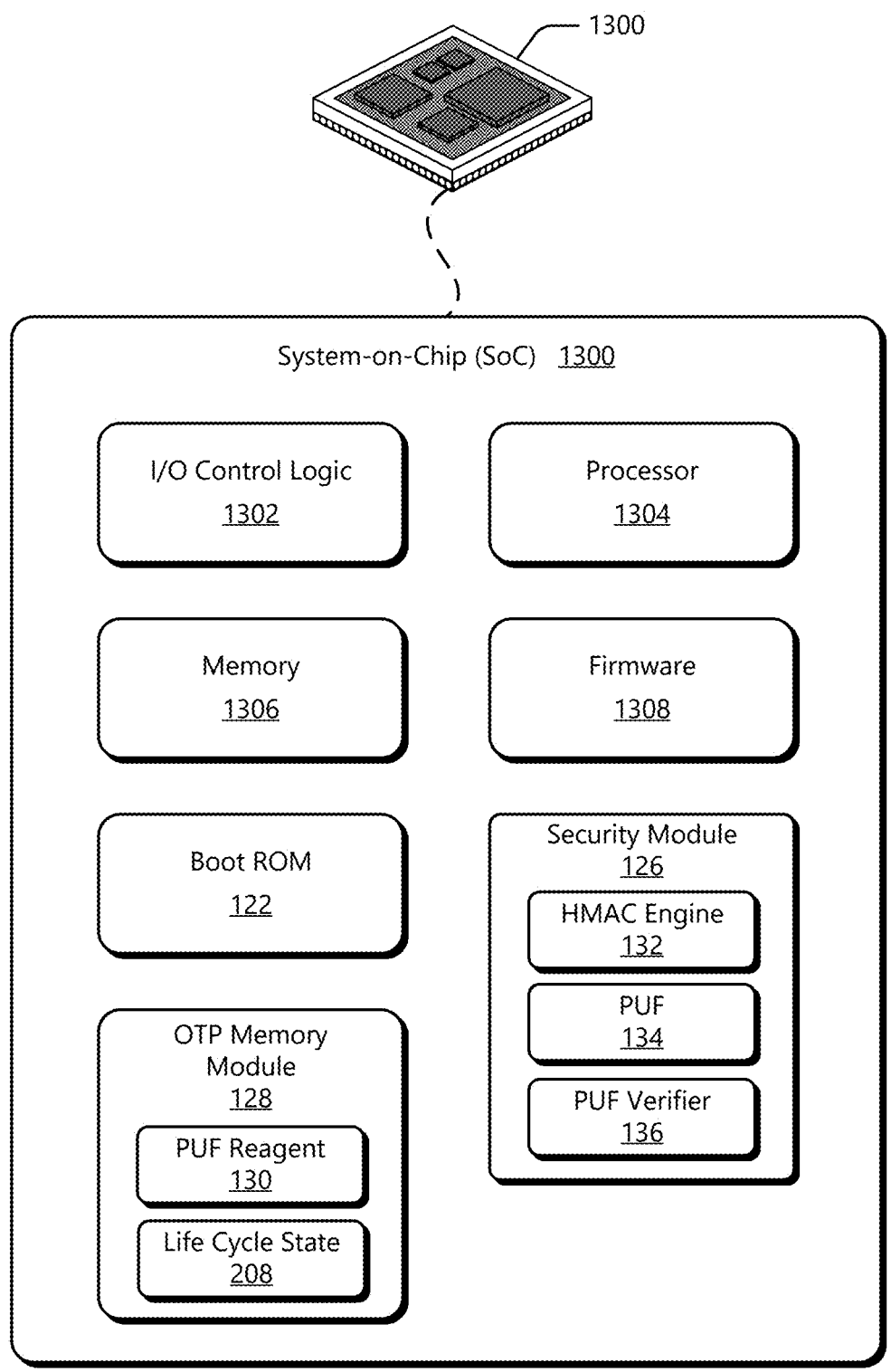
FIG. 13 illustrates an example System-on-Chip (SoC) environment in which aspects of secure verification of a PUF may be implemented.

FIG. 13 illustrates an example System-on-Chip (SoC) 1300 environment in which various aspects of secure verification of a PUF can be implemented. The SoC 1300 may be implemented in any suitable system or device, such as a smart-phone, a netbook, a tablet computer, an access point, a network-attached storage device, a camera, a smart appliance, a printer, a set-top box, a server, a data storage center, a solid-state drive (SSD), a hard disk drive (HDD), an optical storage drive, a holographic storage system, a storage drive array, a memory module, a cryptography accelerator, an automotive computing system, or an aggregate storage controller, or any other suitable type of device (e.g., others described herein). Although described with reference to an SoC, the entities of FIG. 13 may also be implemented as other types of integrated circuits or embedded systems, such as an application-specific integrated-circuit (ASIC), communication controller, memory controller, storage controller, communication controller, ASSP, DSP, PSoC, system-in-package (SiP), or FPGA.

The SoC 1300 may be integrated with electronic circuitry, a microprocessor, memory, input-output (I/O) control logic, communication interfaces, firmware, and/or software useful to provide functionalities of a computing device, host system, storage system, communication system, such as any of the devices or components described herein (e.g., computing device with cryptographic capabilities). The SoC 1300 may also include an integrated data bus or interconnect fabric (not shown) that couples the various components of the SoC for control signaling, data communication, and/or routing between the components. The integrated data bus, interconnect fabric, or other components of the SoC 1300 may be exposed or accessed through an external port, a parallel data interface, a serial data interface, a fabric-based interface, a peripheral component interface, or any other suitable data interface. For example, the components of the SoC 1300 may access or control external storage media, data ports, processing blocks, communication interfaces, or neural networks, through an external interface or off-chip data interface.

In this example, the SoC 1300 includes various components such as input-output (I/O) control logic 1302 and a hardware-based processor 1304 (processor 1304), such as a microprocessor, a processor core, an application processor, DSP, or the like. The SoC 1300 also includes memory 1306, which may include any type and/or combination of RAM, SRAM, DRAM, non-volatile memory, ROM, multiple-time programmable (MTP) memory, Flash memory, and/or other suitable electronic data storage. In some aspects, the processor 1304 and code stored on the memory 1306 are implemented as a system or controller to provide various functionalities associated with cryptographic, encryption, or security associated with use of a PUF key or other secret values derived from the PUF key. In the context of this disclosure, the memory 1306 stores data, code, instructions, or other information via non-transitory signals, and does not include carrier waves or transitory signals. Alternately or additionally, the SoC 1300 may comprise a data interface (not shown) for accessing additional or expandable off-chip storage media, such as solid-state memory (e.g., Flash or NAND memory), magnetic-based memory media, or optical-based memory media.

The SoC 1300 may also include firmware 1308, applications, programs, software, and/or an operating system, which may be embodied as processor-executable instructions maintained on the memory 1306 for execution by the processor 1304 to implement functionalities of the SoC 1300. The SoC 1300 may also include other communication interfaces, such as a transceiver interface for controlling or communicating with components of a local on-chip (not shown) or off-chip communication transceiver. Thus, in some aspects, the SoC 1300 may be implemented or configured as a secure computing device or secure system that is capable of implementing aspects of secure verification of the PUF to ensure accuracy of the PUF and key values provided by the PUF. Alternately or additionally, the SoC 1300 may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 1300. For example, the SoC 1300 may include a transceiver interface configured to enable communication or storage over a wired or wireless network, such as to provide a secure communication or secure storage functionalities with securely verified PUF key values.

In this example, the SoC 1300 also includes a security module 126 and an OTP memory module 128, which may be implemented separately as shown or combined with a storage component, communication component, cryptography component, and so forth. In accordance with various aspects of secure verification of a PUF, a PUF verifier generates a PUF reagent value by obtaining a key from a PUF and a message value useful for PUF verification. The PUF verifier then computes a digest value of the PUF key and the message value and selects a portion of the hash digest as a PUF reagent value. The PUF verifier writes the PUF reagent value to a non-volatile memory (e.g., OTP memory) to enable subsequent verification of the PUF. In some aspects, the PUF verifier also generates error-correction code information for the PUF reagent value and writes this information to the non-volatile memory to enable error correction. On hardware resets, the PUF verifier can securely verify PUF operation by generating a PUF key, computing a hash value from the PUF key, and comparing the hash value with the PUF reagent value without exposing the PUF key. Any of these entities may be embodied as disparate or combined components, as described with reference to various aspects presented herein. For example, the PUF 134 and PUF verifier 136 may be implemented as part of the OTP memory module 128 or another security component of the SoC 1300. Examples of these components and/or entities, or of corresponding functionality, are described with reference to the respective components or entities of the environment 100 of FIG. 1 or the respective configurations illustrated in FIGS. 2 and 3, and/or the methods 400, 500, 600, and 1000 described with reference to FIGS. 4-12. The PUF 134, PUF verifier 136, or other components of the security module 126, either in whole or in part, may be implemented as processor-executable instructions maintained by the memory 1306 and executed by the processor 1304 to implement various aspects and/or features of secure verification of the PUF.

The PUF 134 and/or PUF verifier 136 may be implemented independently or in combination with any suitable component or circuitry to implement aspects described herein. For example, the PUF 134 or PUF verifier 136 may be implemented as part of cryptography logic, hardware-based security module (e.g., security module 126), DSP, processor/storage bridge, a cryptographic intellectual property IP block, a cryptographic accelerator, a cryptographic processor, an encryption engine, a communication controller, a storage controller, graphics processing unit, memory controller, arithmetic logic unit (ALU), or the like. The PUF 134 and/or PUF verifier 136 may also be provided integrally with other entities of the SoC 1300, such as integrated with the processor 1304, the memory 1306, boot ROM 122, a cryptographic block, or the firmware 1308 of the SoC 1300. Alternately or additionally, the PUF 134, PUF verifier 136, and/or other components of the SoC 1300 may be implemented as hardware, firmware, fixed logic circuitry, or any combination thereof.

Although the subject matter of secure verification of a PUF has been described in language specific to structural features and/or methodological operations, it is to be understood that the subject matter defined in the appended claims is not necessarily limited to the specific examples, features, or operations described herein, including orders in which they are performed.

What is claimed is:

1. A method for secure verification of a physical unclonable function (PUF), comprising:
    obtaining a key from the PUF of an integrated circuit as a PUF key value;
    obtaining a predefined message of bit values configured to enable PUF verification;
    computing a hash digest of the PUF key value and the predefined message of bit values configured to enable PUF verification;
    selecting, as a PUF reagent value, at least a portion of the hash digest of the PUF key value and the predefined message of bit values; and
    writing the PUF reagent value to a non-volatile memory of the integrated circuit to enable subsequent verification of the PUF of the integrated circuit based on the PUF reagent value.

2. The method of claim 1, wherein:
    the computing of the digest comprises providing the PUF key value directly from the PUF to an input of a cryptographic hash function; and
    the PUF key value is a secret value that is not exposed to or accessible by any other component of the integrated circuit.

3. The method of claim 1, further comprising, after writing the PUF reagent value to the non-volatile memory, setting a life cycle state of the integrated circuit to a state that indicates storage of the PUF reagent value to the non-volatile memory.

4. The method of claim 3, wherein the setting of the life cycle state advances, in the non-volatile memory, a value that corresponds to the life cycle state of the integrated circuit from a manufacturing state to a field state or deploy state in which access to the integrated circuit is restricted.

5. The method of claim 1, wherein the predefined message of bit values that is configured to enable PUF verification comprises a predefined pattern of bit values that repeats at least one time within the predefined message.

6. The method of claim 1, further comprising:
generating error-correction code (ECC) information for the PUF reagent value; and
writing the ECC information for the PUF reagent value to the non-volatile memory of the integrated circuit.

7. The method of claim 6, further comprising:
reading the PUF reagent value from the non-volatile memory;
reading the ECC information for the PUF reagent value;
performing error correcting on the PUF reagent value using the ECC information to provide an error corrected-PUF reagent value; and
comparing the PUF reagent value with the error corrected-PUF reagent value to verify the PUF reagent value written to the non-volatile memory.

8. The method of claim 1, wherein the hash digest comprises at least 128 bits and the selecting of the at least a portion of the hash digest comprises selecting:
at least eight bits of the hash digest as the PUF reagent value;
at least 16 bits of the hash digest as the PUF reagent value;
at least 32 bits of the hash digest as the PUF reagent value; or
at least 64 bits of the hash digest as the PUF reagent value.

9. The method of claim 1, wherein the non-volatile memory of the integrated circuit comprises a one-time programmable fuse-based memory of the integrated circuit.

10. A method for secure verification of a physical unclonable function (PUF), comprising:
obtaining a PUF key value from the PUF of an integrated circuit;
obtaining a predefined message of bit values configured to enable PUF verification;
computing a hash digest of the PUF key value and the predefined message of bit values configured to enable verification of the PUF;
obtaining a PUF reagent value from a non-volatile memory of the integrated circuit;
comparing at least a portion of the hash digest of the PUF key value and the predefined message with a corresponding portion of the PUF reagent value; and
indicating verification of operation of the PUF of the integrated circuit in response to the at least a portion of the hash digest of the PUF key value and the predefined message matching the corresponding portion of the PUF reagent value; or
indicating failure to verify the operation of the PUF of the integrated circuit in response to the portion of the hash digest of the PUF key value and the predefined message not matching the corresponding portion of the PUF reagent value.

11. The method of claim 10, further comprising:
enabling a cryptography function or a security function of the integrated circuit based on the verification of the PUF of the integrated circuit; or
disabling the cryptography function or the security function of the integrated circuit based on the failure to verify the PUF of the integrated circuit.

12. The method of claim 10, wherein:
the computing of the digest comprises providing the PUF key value directly from the PUF to an input of a cryptographic hash function; and
the PUF key value is a secret value that is not exposed to or accessible by any other component of the integrated circuit.

13. The method of claim 10, further comprising:
obtaining error-correcting code (ECC) information for the PUF reagent value from the non-volatile memory of the integrated circuit;
performing error correcting on the PUF reagent value using the ECC information to provide an error corrected-PUF reagent value; and
wherein the comparing compares the portion of the hash digest of the PUF key value and the predefined message of bit values with a corresponding portion of the error corrected-PUF reagent value; or
in response to failure of the error correcting of the PUF reagent value, indicating an uncorrectable error in the PUF reagent value and preventing verification of the PUF of the integrated circuit.

14. The method of claim 10, wherein the non-volatile memory of the integrated circuit comprises a one-time programmable fuse-based memory of the integrated circuit.

15. An integrated circuit comprising:
a physical unclonable function (PUF) configured to generate key values;
a cryptographic function configured to compute hash digests;
a non-volatile memory;
a processor configured to execute secure firmware; and
a PUF verifier configured to:
load a PUF key value from the PUF to the cryptographic function;
load, from the processor to the cryptographic function, a predefined message of bit values configured to enable PUF verification;
direct the cryptographic function to compute a digest value of the PUF key value and the predefined message of bit values;
select at least a portion of the hash digest of the PUF key value and the predefined message of bit values as a PUF reagent value; and
write the PUF reagent value to the non-volatile memory of the integrated circuit to enable subsequent verification of the PUF of the integrated circuit.

16. The integrated circuit of claim 15, wherein:
the PUF verifier loads the PUF key value directly from an output of the PUF to an input of the cryptographic function; and
the PUF key value is a secret value that is not exposed to or accessible by any other component of the integrated circuit.

17. The integrated circuit of claim 15, wherein the PUF verifier is further configured to:
generate error-correction code (ECC) information for the PUF reagent value; and
write the ECC information for the PUF reagent value to the non-volatile memory of the integrated circuit.

18. The integrated circuit of claim 15, wherein the PUF verifier is further configured to set, after writing the PUF reagent value to the non-volatile memory, a value in the non-volatile memory that corresponds to a life cycle state of the integrated circuit from a manufacturing state to a field state or a deploy state in which access to the integrated circuit is restricted.

19. The integrated circuit of claim 15, wherein the non-volatile memory comprises a one-time programmable fuse-based memory.

20. The integrated circuit of claim 15, wherein the integrated circuit is embodied as a system-on-chip, a hardware-based security module, a cryptographic intellectual property (IP) block, a cryptographic accelerator, a cryptographic processor, an encryption engine, a communication controller, or a storage controller.

\* \* \* \* \*